US010940952B2

(12) United States Patent
Inkpen et al.

(10) Patent No.: US 10,940,952 B2
(45) Date of Patent: Mar. 9, 2021

(54) APPARATUS AND METHOD OF MONITORING FOR IN-FLIGHT AIRCRAFT ENGINE ICE CRYSTAL ACCRETION

(71) Applicant: INSTRUMAR LIMITED, St. John's (CA)

(72) Inventors: Stuart Inkpen, St. Philips (CA); Chris Nolan, St. John's (CA); Bill Conway, St. John's (CA); Dana Linfield, Portugal Cove-St. Philips (CA); David Bonnell, St. John's (CA); Joshua Swamidas, St. John's (CA); Ruth Abraham, St. John's (CA)

(73) Assignee: INSTRUMAR LIMITED

( * ) Notice: Subject to any disclaimer, the term of this patent is extended or adjusted under 35 U.S.C. 154(b) by 697 days.

(21) Appl. No.: 15/571,588

(22) PCT Filed: May 5, 2016

(86) PCT No.: PCT/CA2016/050517
§ 371 (c)(1),
(2) Date: Nov. 3, 2017

(87) PCT Pub. No.: WO2016/176773
PCT Pub. Date: Nov. 10, 2016

(65) Prior Publication Data
US 2018/0155037 A1    Jun. 7, 2018

(51) Int. Cl.
*F02C 7/047*    (2006.01)
*B64D 15/20*    (2006.01)
(Continued)

(52) U.S. Cl.
CPC .............. *B64D 15/20* (2013.01); *B64D 15/12* (2013.01); *B64D 45/00* (2013.01); *G08B 19/02* (2013.01)

(58) Field of Classification Search
USPC .......................................................... 340/962
See application file for complete search history.

(56) References Cited

U.S. PATENT DOCUMENTS

| 5,191,791 A | 3/1993 | Gerardi et al. |
| 5,313,202 A | 5/1994 | Hansman, Jr. et al. |
(Continued)

FOREIGN PATENT DOCUMENTS

WO    03/002410    1/2003

OTHER PUBLICATIONS

ON-WINGS, Aerodays Workshop, On Wing Ice Detection and Monitoring System, Apr. 1, 2011, 25 pages, Madrid.
(Continued)

*Primary Examiner* — Brent Swarthout
(74) *Attorney, Agent, or Firm* — Cardinal Law Group (57) ABSTRACT

A method of monitoring for the in-flight accretion of matter involves an electric field sensor applying a time-varying electric field to an engine surface of an aircraft while the aircraft is in flight. The electric field sensor is thermally-coupled and thermally-matched to the engine surface. A sensor monitor receives, in substantially real-time from the electric field sensor, at least one measurement set that includes a measurement of a phase and a magnitude of a current detected by the electric field sensor and resulting from the time-varying electric field. The sensor monitor generates an assessment, in substantially real-time, of an instantaneous accumulation of matter on the engine surface from the at least one measurement set. The sensor monitor activates an alarm upon the assessment indicating an accumulation of matter on the engine surface.

20 Claims, 5 Drawing Sheets

(51) Int. Cl.
*B64D 15/12* (2006.01)
*B64D 45/00* (2006.01)
*G08B 19/02* (2006.01)

(56) References Cited

U.S. PATENT DOCUMENTS

| | | | |
|---|---|---|---|
| 5,394,340 | A | 2/1995 | Inkpen et al. |
| 5,398,547 | A | 3/1995 | Gerardi |
| 5,484,121 | A | 1/1996 | Padawer |
| 5,551,288 | A | 9/1996 | Gerardi |
| 5,874,672 | A | 2/1999 | Gerardi et al. |
| 7,370,525 | B1 | 5/2008 | Zhao et al. |
| 7,466,146 | B2 | 12/2008 | Stewart et al. |
| 7,586,419 | B2 | 9/2009 | Ikiades et al. |
| 9,180,972 | B2 | 11/2015 | Meis et al. |
| 9,527,595 | B2 * | 12/2016 | Inkpen .............. G01R 19/0092 |
| 2004/0206854 | A1 * | 10/2004 | Shah ..................... B64D 15/20 |
| | | | 244/144 |
| 2006/0064196 | A1 | 3/2006 | Inkpen et al. |
| 2006/0186755 | A1 * | 8/2006 | Mori .................... H03H 9/0542 |
| | | | 310/313 R |
| 2008/0257033 | A1 | 10/2008 | Roberts |
| 2015/0115105 | A1 * | 4/2015 | Renno .................... B64D 15/20 |
| | | | 244/134 F |
| 2015/0377129 | A1 * | 12/2015 | Ward ..................... F02C 7/047 |
| | | | 60/39.093 |

OTHER PUBLICATIONS

FAA Federal Register vol. 75, No. 124, Jun. 29, 2010, 29 pages.
International Search Report re PCT/CA2013/000003, dated Apr. 22, 2013, 3 pgs.
Ice protection system, http://en.wikipedia.org/wiki/Ice_protection_system#TKS_Ice_Protection.
Mason J., Engine Power Loss in Ice Crystal Conditions, Aero Quarterly, QTR_04/07; WWW.boeing.com/commercial/aeromagazine.
Jeck R. K., Models and Characteristics of Freezing Rain and Freezing Drizzle for Aircraft Icing Applications, FAA Report DOT/FAA/AR-09/45, Jan. 2010.

* cited by examiner

APPARATUS AND METHOD OF MONITORING FOR IN-FLIGHT AIRCRAFT ENGINE ICE CRYSTAL ACCRETION

FIELD

This patent application relates to a mechanism for monitoring for the in-flight accretion of ice crystals on aircraft engine surfaces.

BACKGROUND

Aircraft may be exposed to various atmospheric icing conditions in-flight, such as small water droplets less than 25 um diameter (e.g. clouds, fog) and super-cooled large water droplets greater than 25 um diameter (e.g. freezing rain, freezing drizzle). Ice accretion resulting from exposure to these atmospheric icing conditions, in and around the warm surfaces of an aircraft engine, such as the cowling and/or air intake ducts of turbofan engines, the carburetor mouth and/or throttle body of piston engines, and even the internal surfaces of the engine, can cause engine damage and/or a sudden loss in engine output power and aircraft stability. Therefore, many modern aircraft engines incorporate countermeasures, such as heating systems, to reduce the likelihood or extent of engine ice accretion on the external and internal engine surfaces. However, over the past 20 years there have been over 100 reported cases of aircraft engine power loss as a result of ice accretion on engine surfaces.

SUMMARY

This patent application describes a method and system for monitoring for the in-flight accumulation of matter on an aircraft engine surface, in which an electric field sensor is thermally-coupled and thermally-matched to the engine surface. With this configuration, the accumulation of matter on the engine surface can be monitored while the aircraft is in flight, but without significantly interfering with the normal buildup of matter on the engine surface while the aircraft is in flight.

The method of monitoring for the in-flight accumulation of matter on an aircraft engine surface involves the electric field sensor applying a time-varying electric field to an engine surface of an aircraft while the aircraft is in flight. The electric field sensor is thermally-coupled and thermally-matched to the engine surface.

A sensor processing unit receives, in substantially real-time from the electric field sensor, at least one measurement set that includes a measurement of a phase and a magnitude of a current detected by the electric field sensor and resulting from the time-varying electric field. The sensor processing unit generates an assessment, in substantially real-time, of an instantaneous accumulation of matter on the engine surface from the at least one measurement set. The sensor processing unit activates an alarm upon the assessment indicating an accumulation of matter on the engine surface.

This in-flight engine matter accumulation monitoring system includes an electric field sensor unit and a sensor processing unit. The electric field sensor is thermally-coupled to and thermally-matched to an engine surface of an aircraft.

The sensor processing unit is configured to receive, in substantially real-time from the electric field sensor, at least one measurement set that includes a measurement of a phase and a magnitude of a current detected by the electric field sensor and resulting from a time-varying electric field applied by the electric field sensor to the engine surface. The sensor processing unit is also configured to generate an assessment, in substantially real-time, of an instantaneous accumulation of matter on the engine surface from the at least one measurement set and to activate an alarm upon the assessment indicating an accumulation of matter on the engine surface.

The sensor processing unit may generate an assessment of an accretion of ice crystals on the engine surface, and activate the alarm upon the assessment indicating the accretion of ice crystals exceeding a threshold amount.

The sensor processing unit may generate the assessment by querying a database of predetermined matter accumulation profiles with the at least one measurement set, the matter accumulation profiles each being associated with a respective in-flight accretion of ice crystals on a reference surface. The sensor processing unit may activate the alarm upon the at least one measurement set correlating with at least one of the predetermined matter accumulation profiles.

Alternately, the sensor processing unit may be configured with a matter assessment algorithm, and may generate the assessment by applying the measurement data sets as inputs to the matter assessment algorithm and may activate the alarm upon the matter assessment algorithm indicating the accretion of ice crystals on the engine surface.

Preferably, the electric field sensor is aerodynamically-matched to the engine surface, to allow the accumulation of matter on the engine surface to be monitored while the aircraft is in flight, but without significantly disturbing the normal airflow over the engine surface.

Proposed engine surfaces of the aircraft include the cowling of a turbofan engine, the air intake duct of a turbofan engine, the carburetor mouth of a piston engine, the throttle body of a piston engine, and an internal engine surface.

BRIEF DESCRIPTION OF THE DRAWINGS

The foregoing aspects will now be described, by way of example only, with reference to the accompanying drawings, in which.

DETAILED DESCRIPTION

1. Matter Accumulation Monitoring System: Overview

Figure 1:
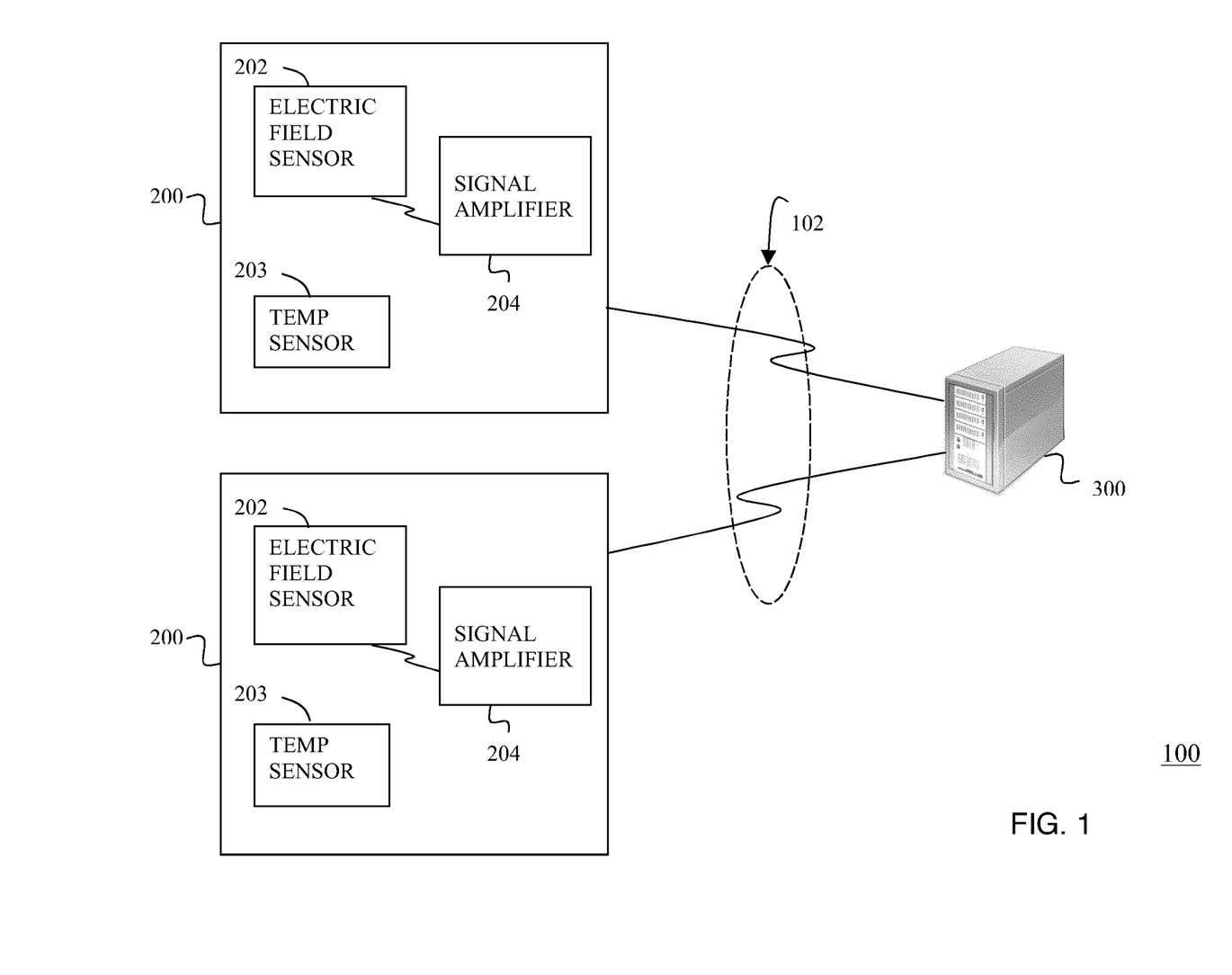
FIG. 1 is a schematic view of the matter accumulation monitoring system, depicting the electric field sensor unit and the sensor processing unit.

Turning now to FIG. 1, there is shown a matter accumulation monitoring system, denoted generally as 100, comprising one or more electric field sensor units 200, a sensor processing unit (SPU) 300, and a wiring harness 102 interconnecting the electric field sensor units 200 and the sensor processing unit (SPU) 300.

As shown, the electric field sensor units 200 are preferably separate and distinct from the SPU 300. Although the functionality of the SPU 300 may also be incorporated into each of the electric field sensor units 200, it should be understood that maintaining the electric field sensor units 200 separate and distinct from the SPU 300 reduces the physical size of the electric field sensor units 200 and allows the electric field sensor units 200 to be better aerodynamically-matched and thermally-matched to the associated aircraft surfaces/engine surfaces.

2. Electric Field Sensor Unit

Each electric field sensor unit 200 is disposed proximate a surface of an aircraft, at a respective region thereof, to monitor the accumulation of matter on the respective region of the aircraft surface while the aircraft is in-flight.

The matter to be monitored may be ice, and one or more of the electric field sensor units 200 may be mounted on and thermally-coupled to an exterior surface of an aircraft at regions thereof that are prone to the accumulation of ice while the aircraft is in-flight. Preferably, the electric field sensor units 200 are aerodynamically-matched to the aircraft surfaces being monitored so as to not disturb the normal airflow and hence the normal buildup of ice on the associated aircraft surfaces. Further, preferably the electric field sensor units 200 are also thermally-matched to the associated aircraft surfaces so as to again not interfere with the normal buildup of ice on the aircraft surfaces.

More preferably, one or more of the electric field sensor units 200 is mounted on and thermally-coupled to an engine surface of an aircraft at regions of the engine that are prone to the accretion of ice crystals while the aircraft is in-flight. Typically an aircraft is fitted with a plurality of the electric field sensor units 200. It is expected that, through experimentation, the person of ordinary skill could determine the appropriate placement of the electric field sensor units 200 to detect ice crystal accretion on engine surfaces while the aircraft is in flight.

Preferably, the electric field sensor units 200 are aerodynamically-matched to the engine surfaces being monitored so as to not disturb the normal airflow and hence the normal buildup of ice crystals on the engine surfaces. Accordingly, the electric field sensor units 200 may be flush-mounted with the respective engine surfaces. As non-limiting examples, one or more of the electric field sensor units 200 may be flush-mounted with a cowling of a turbofan engine, an air intake duct of a turbofan engine, a carburetor mouth of a piston engine, a throttle body of a piston engine, or an internal engine surface.

Although conventional ice mitigation countermeasures have been successful in limiting ice accretion on engine surfaces from exposure to small water droplets less than 25 um diameter (e.g. clouds, fog) and super-cooled large water droplets greater than 25 um diameter (e.g. freezing rain, freezing drizzle), the inventors have learned that fully glaciated water (e.g. ice crystals) can accumulate on the heated surfaces of aircraft engines. In contrast to an aircraft wing where the wing surface remains cold while the aircraft is in flight, the inventors believe that heat transfer from an engine surface while the aircraft is in flight initially causes the ice crystals to melt, but that rapid air flow over the engine surface subsequently cools the melt and causes the ice crystals to adhere to the engine surface. Therefore, so as to again not interfere with the normal buildup of ice on the engine surfaces, preferably the electric field sensor units 200 are also thermally-matched to the associated engine surfaces in the sense that the field sensor units 200 absorb heat from (and introduce heat into) the airstream passing over the electric field sensor units 200 at the same rate as the associated aircraft surface/engine surfaces.

As shown in FIG. 1, preferably each electric field sensor unit 200 includes a signal amplifier 204, and an electric field sensor 202 coupled to the signal amplifier 204. Optionally, the electric field sensor unit 200 may also include a digital temperature sensor 203, and a heater (not shown).

Each electric field sensor 202 generates a time-varying local electric field at the engine surface, and a current is produced in the electric field sensor 202 resulting from the time-varying local electric field. The magnitude and phase of the resulting current varies with the characteristics of the material that is within the electric field established by the electric field sensor 202. Accordingly, the electric field sensor(s) 202 together provide periodic data samples indicative of the accretion of ice crystals on the associated aircraft surface/engine surface.

The temperature sensors 203 monitor the temperature of the associated aircraft surfaces/engine surfaces and are typically used to calibrate the electric field sensor 202. Alternately, or additionally, the temperature sensor(s) 203 may be used in the detection of ice crystals on the associated aircraft surfaces/engine surfaces.

Figure 2A:
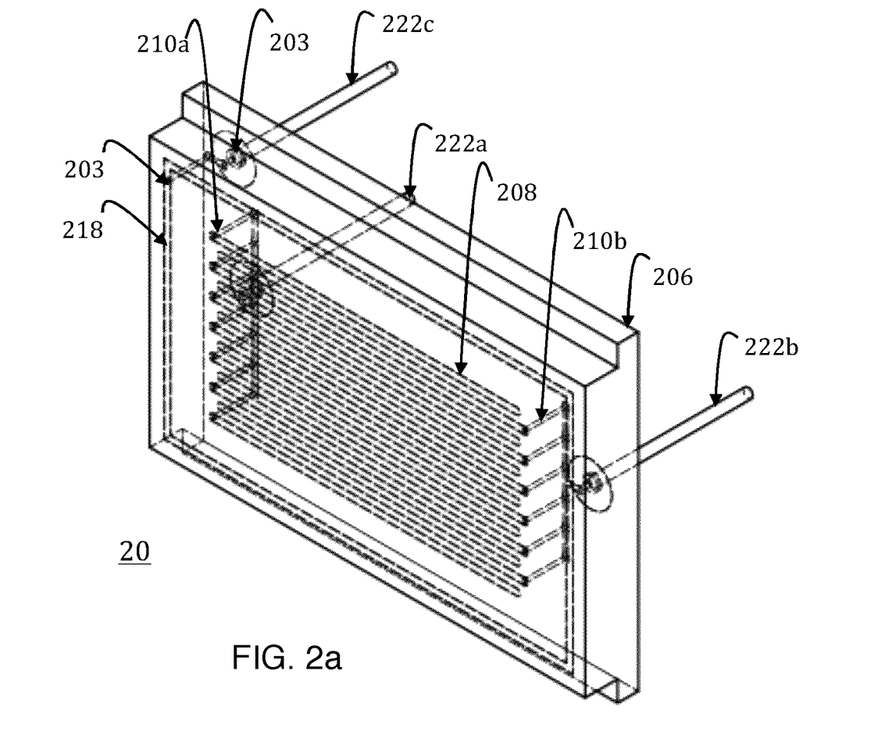
FIG. 2a is a perspective view of the electric field sensor.
Figure 2B:
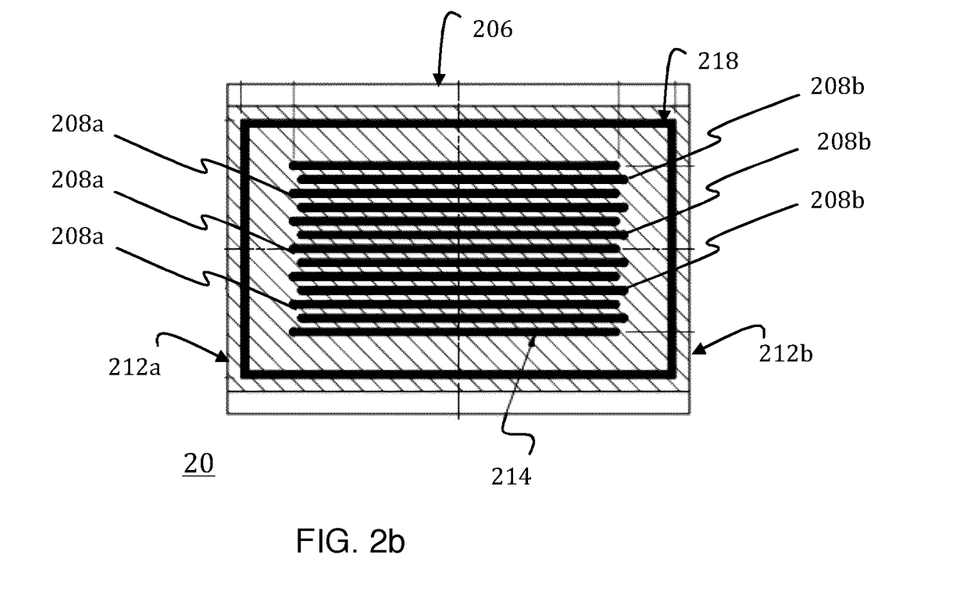
FIG. 2b is a top plan view of the electric field sensor.
Figure 2C:
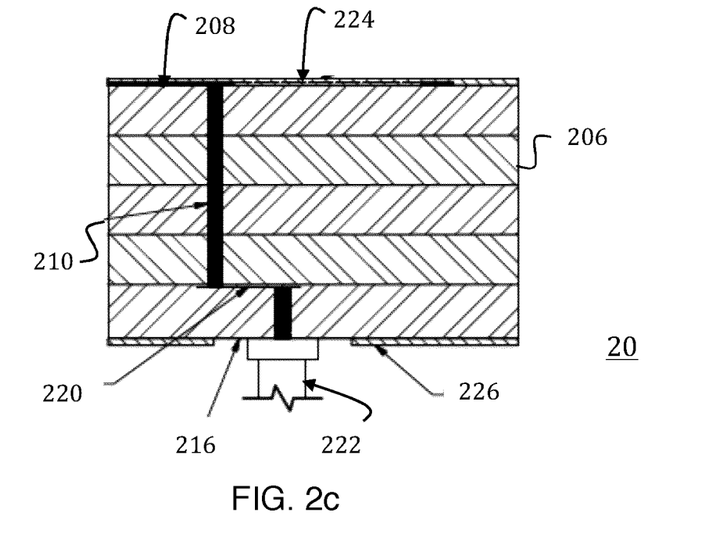
FIGS. 2c and 2d are transverse cross-sectional views of the electric field sensor.

As shown in FIGS. 2*a*, 2*b* and 2*c*, each electric field sensor 202 comprises an insulating substrate 206, a plurality of electrodes 208 disposed on the substrate 206, and a plurality of vias 210 coupled to the plurality of electrodes 208 and extending downwardly through the substrate 206. Preferably, the substrate 206 comprises a non-conductive material, such as ceramic, although other non-conductive materials may be used. The electrodes 208 are typically formed on the substrate 206 using conventional printed circuit board or integrated circuit manufacturing techniques. The electrodes 208 extend across the top surface of the substrate 206 in a substantially parallel fashion, such that the electrodes 208 do not contact one another on the top surface of the substrate 206.

The electrodes 208 are segregated into a first electrode portion 208*a*, and a second electrode portion 208*b*. The electrodes 208 of the first electrode portion 208*a* are not in contact with one another and extend from one end 212*a* of the substrate 206, and the electrodes 208 of the second electrode portion 208*b* are not in contact with one another and extend from the opposite end 212*b* of the substrate 206. The electrodes 208 of the first electrode portion 208*a* are interleaved with and are disposed substantially parallel to the electrodes 208 of the second electrode portion 208*b* in the centre region 214 of the top surface of the substrate 206.

Typically, each via 210 comprises a plated through-hole extending from one end of a respective electrode 208, through the substrate 206, towards the bottom surface 216 of the electric field sensor unit 200. Alternately, the vias 210 may be provided as conductive traces or wires extending in a similar manner. The vias 210 are segregated into a first via portion 210*a* and a second via portion 210*b*. The vias 210 of the first via portion 210*a* are coupled to the first electrode portion 208*a*, and the vias 210 of the second via portion 210*b* are coupled to the second electrode portion 208*b*.

Each via 210 is connected to a respective electrode 208 adjacent the respective end 212, and extends at a right angle from the electrode 208 through the substrate 206, from the top surface of the electric field sensor unit 200 towards the bottom surface 216 of the electric field sensor unit 200. Preferably, the electric field sensor 202 also includes a ground ring 218, disposed on the substrate 206 laterally outwards from the electrodes 208 and the vias 210. The ground ring 218 may be connected to electrical grounds of the signal amplifier 204. With this configuration, the sensitivity of the electric field sensor 202 to electric fields outside the centre region 214 is less than conventional electric field sensors.

Each via 210 of the first via portion 210a terminates at a first conductive plate 220 that is embedded within the substrate 206 of the electric field sensor unit 200. Similarly, each via 210 of the second via portion 210b terminates at a second conductive plate (not shown) that is embedded within the substrate 206 (but separate from the first conductive plate 220).

The electric field sensor 202 preferably also includes a top electrically-insulating layer 222 disposed over the electrodes 208, and a bottom electrically-insulating layer 224 disposed over the bottom surface 216 of the electric field sensor unit 200. As discussed, preferably the electric field sensor units 200 are aerodynamically-matched to the aircraft surfaces/engine surfaces being monitored. Accordingly, preferably the top insulating layer 222 is aerodynamically-matched to the shape and contour of the associated aircraft surface/engine surface so as to not disturb the normal airflow and hence the normal buildup of ice crystals on the aircraft surface/engine surface. Typically, the top insulating layer 222 is disposed substantially flush with the associated aircraft surface/engine surface. As discussed, suitable engine surfaces include, but are not limited to, the cowling of a turbofan engine, the air intake duct of a turbofan engine, the carburetor mouth of a piston engine, the throttle body of a piston engine, and an internal engine surface.

Figure 2D:
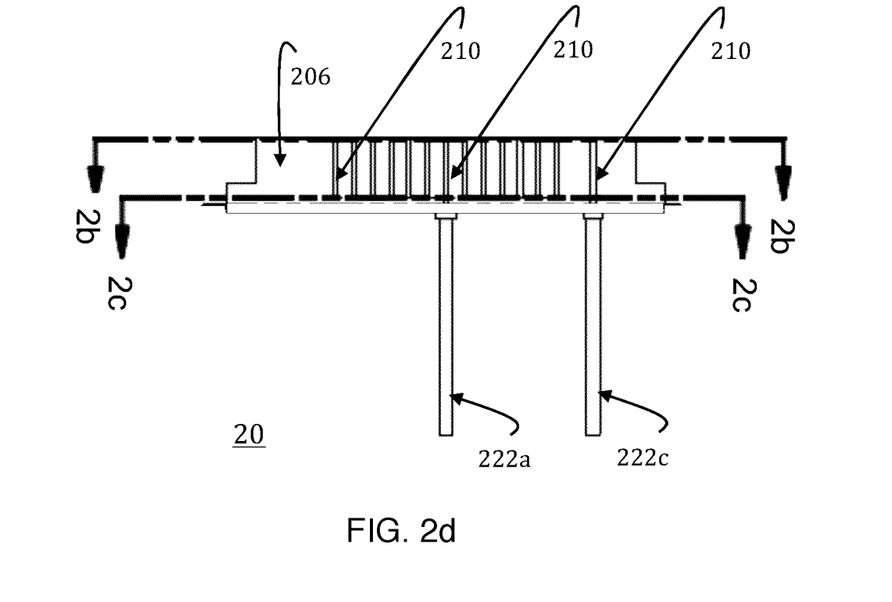

As discussed, preferably the electric field sensor units 200 are thermally-coupled and thermally-matched to the aircraft surfaces/engine surfaces being monitored. Accordingly, so as to further not interfere with the normal buildup of ice on the aircraft surface/engine surface, preferably the top insulating layer 222 is thermally-matched to the associated aircraft surface/engine surface such that the top insulating layer 222 absorbs heat from (and introduces heat into) the airstream passing over the insulating layer at the same rate as the associated aircraft surface/engine surface. Typically, the insulating layers 222, 224 each comprises a ceramic or glass, although the ceramic alumina is preferred due to its hardness and thermal conductivity Preferably, the signal amplifier 204 is incorporated into the electric field sensor unit 200 below the electric field sensor 202 and is connected to the vias 210 of the electric field sensor 202 via the conductive plates 220. First and second electrically-conductive pins 226a, 226b extend from the signal amplifier 204 and out the bottom surface 216 of the electric field sensor unit 200.

As will be explained, the sensor processing unit (SPU) 300 applies time-varying analog voltage signals to the first and second conductive pins 226a, 226b via the wiring harness 102. The signal amplifier 204 receives the time-varying analog voltage signals via the conductive pins 226a, 226b, amplifies the analog voltage signals, and applies the amplified analog voltage signals to the electrodes 208 of the electric field sensor 202 via the vias 210. Preferably, the analog voltage signal applied to the first electrode portion 208a is complementary (i.e. 180 degrees out of phase) with the analog voltage signal applied to the second electrode portion 208b.

The amplified analog voltage signals cause the electrodes 208 to apply a time-varying electric field to the aircraft surface/engine surface that is proximate the electric field sensor 202. The time-varying electric field causes an analog current to be produced in the electrodes 208 of the electric field sensor 202. The signal amplifier 204 detects the resulting analog current via the vias 210 of the electric field sensor 202, generates an analog voltage signal from the resulting current, and applies the generated analog voltage signal to the first and second conductive pins 226a, 226b. The SPU 300 detects the generated analog voltage signal at the first and second conductive pins 226a, 226b via the wiring harness 102.

Preferably, the temperature sensor 203 is incorporated into the associated electric field sensor 202 proximate the top surface of the substrate 206, and the electric field sensor 202 includes a via 210 that extends through the substrate 206 from proximate the top surface towards the bottom surface 216 of the electric field sensor unit 200. A third electrically-conductive pin 222c extends from the via 210 of the temperature sensor 203 and out the bottom surface 226 of the electric field sensor unit 200. Alternately, each temperature sensor 203 may be disposed in a substrate that is separate from the substrate 206 of the electric field sensor unit 200.

The temperature sensor 203 generates a serial digital output signal that includes temperature measurement samples of the ambient temperature proximate the electric field sensor 202, and applies the generated digital temperature measurement signal to the third conductive pin 226c. The SPU 300 receives the temperature measurement samples, that are output at the third conductive pin 226c, via the wiring harness 102.

Preferably, the heater is also incorporated into the associated electric field sensor 202 proximate the top surface of the substrate 206, and is connected to the SPU 300 via the wiring harness 102. As will be explained, the SPU 300 uses the heater to melt ice that may have accumulated proximate an electric field sensor unit 200. However, so as to avoid frustrating the detection of ice at an electric field sensor unit 200 (by interfering with the thermal matching between the electric field sensor unit 200 and the aircraft surfaces/engine surfaces being monitored), the heater is otherwise typically inactive while the aircraft is in flight.

3. Sensor Processing Unit

Figure 3:
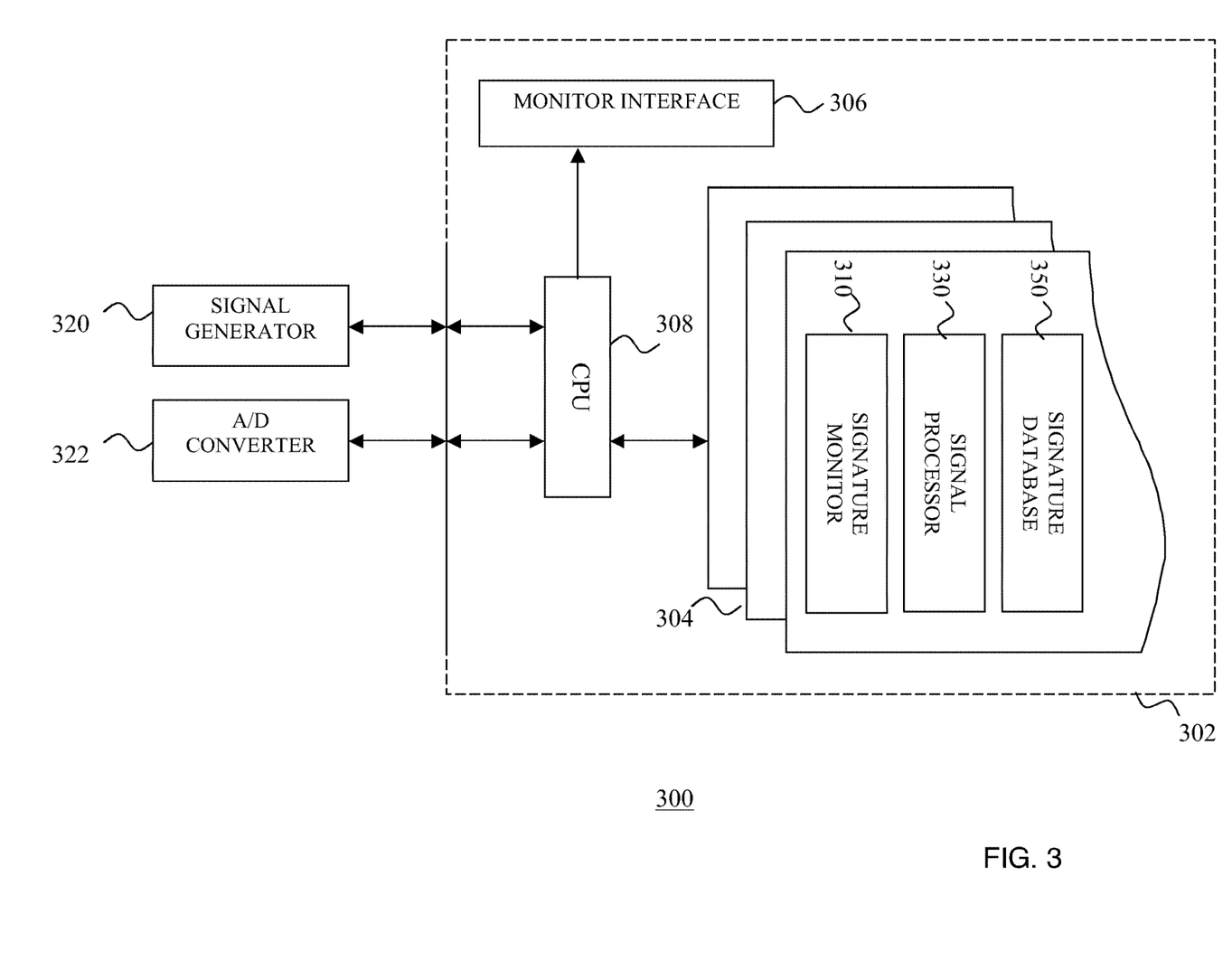
FIG. 3 is a schematic view of the structure of the sensor processing unit.

The sensor processing unit (SPU) 300 is typically disposed within the aircraft cockpit, and is coupled to the electric field sensor units 200 via the wiring harness 102. As shown in FIG. 3, preferably the SPU 300 includes a sensor monitor 302, and an analog signal generator 320, and an A/D converter 322.

The sensor monitor 302 comprises a non-volatile non-transient memory 304, a monitor interface 306, and a central processing unit (CPU) 308 that is coupled to the non-volatile memory 304 and the monitor interface 306. The monitor interface 306 may interface the SPU 300 with the instrumentation of the aircraft cockpit to thereby provide pilots with a substantially-real time assessment of the accumulation of matter on the aircraft surfaces/engine surfaces.

The non-transient memory 304 may be provided as an electronic memory, a magnetic disc and/or an optical disc, and may include a signatures database 350 of one or more predetermined matter accumulation profiles. Each predetermined matter accumulation profile is associated with a particular characteristic (e.g. thickness, matter type) of the matter accumulated, and comprises a corresponding time-series of complex admittance values and optionally temperature values. Typically each predetermined matter accumulation profile includes a time-series of complex admittance values and optionally temperature values for a particular matter accumulation characteristic while the aircraft is in flight. The time-series of complex admittances and temperatures (if included) in each matter accumulation profile may be predetermined experimentally and/or via computer modelling, and may be typically stored in the memory 304 prior to installation of the SPU 300 in the aircraft.

The non-transient memory 304 also stores processing instructions for the SPU 300 which, when executed by the CPU 308, may define a signature monitor 310 and a signal processor 330. The signature monitor 310 commands the analog signal generator 320 to generate and apply a time-varying analog voltage signal to the signal amplifier 204 of each of the electric field sensor units 200. As discussed, the signal amplifier 204 amplifies the received analog voltage signal, and applies the amplified analog voltage signals to the electrodes 208 of the electric field sensor 202. The amplified analog voltage signal cause the electrodes 208 to apply a time-varying electric field to the aircraft surface/engine surface that is proximate the electric field sensor 202. The time-varying electric field causes an analog current to be produced in the electrodes 208 of the electric field sensor 202. The signal amplifier 204 detects the resulting analog current, and generates an analog voltage signal from the resulting current.

The A/D converter 322 periodically digitizes, over a measurement time span, the analog voltage signals generated by the signal amplifier 204 of the electric field sensor(s) 202 and provides the signal processor 330, in substantially real-time, with the digitized version of the analog voltage signals (hereinafter the "digitized current measurement samples").

The signal processor 330 uses the digitized current measurement samples from the A/D converter 322, and optionally the digital temperature measurement samples from the temperature sensors 203, to create a time-series of measurement data sets. Each measurement data set includes a magnitude measurement and a phase measurement. Preferably, the signal processor 330 derives the magnitude and phase measurements from the digitized current measurement samples by referencing the magnitude and phase of the current produced in the electric field sensor(s) 202 respectively to the magnitude and phase of the applied sensor voltage signals. In effect, then, the magnitude and phase measurements are complex admittance measurements. However, for ease of reference, the current magnitude and current phase measurements (referenced to the applied sensor voltage) will be referred to hereinafter respectively as magnitude measurements and phase measurements and collectively as complex admittance measurements.

As discussed, the temperature sensors 203 are typically used to calibrate the electric field sensor 202. Therefore, for example, for calibration, the signal processor 330 may use temperature samples received from the temperature sensor(s) 203 to compute weight factors to apply to the complex admittance measurements.

In addition to the complex admittance measurements, each measurement data set may optionally also include the digitized temperature measurement sample that was taken when the associated digitized current measurement sample was generated. Each measurement data set may also identify the time at which the complex admittance measurements and temperature measurements were taken.

The inventors have determined that the values for the complex admittance measurements, and also the variability (e.g. rate of change, range of fluctuation) in those values between successive measurements, varies with the characteristics of the matter accumulating on the aircraft surface/engine surface. Therefore, to facilitate the detection of matter accumulating on the aircraft surface/engine surface, and the differentiation between different matter accumulating on the aircraft surface/engine surface, the signal processor 330 provides the signature monitor 310 with the time-series of the complex admittance measurements (and optionally temperature measurements). The signature monitor 310 is configured to use the time-series of complex admittance measurements (and optionally temperature measurements) to generate an assessment of the instantaneous accumulation of matter on the aircraft surface/engine surface in substantially-real time.

The signature monitor 310 may generate the assessment by querying the signatures database 350 with the received measurement data sets for corresponding (identical or similar) predetermined matter accumulation profiles. Alternately, the signature monitor 310 (or the signal processor 330) may be configured with a matter assessment algorithm that generates the assessment of the instantaneous accumulation of matter from the measurement data sets.

The signature monitor 310 may then generate and transmit an alarm signal to the aircraft cockpit in real time if one or more of the received measurement data sets correlates with one of the predetermined matter accumulation profiles, indicating that ice crystals have accreted on an aircraft surface/engine surface. Alternately, the signature monitor 310 may generate and transmit an alarm signal to the aircraft cockpit in real time if the matter assessment algorithm determines that ice crystals have accreted on an aircraft surface/engine surface.

As discussed above, the signature monitor 310 and the signal processor 330 may each be implemented as a set of computer processing instructions. However, the implementation of the signature monitor 310 and the signal processor 330 is not so limited, but may each be implemented instead in electronics hardware, such as a field programmable logic gate array (FPGA) or a complex programmable logic device (CPLD).

4. Matter Accumulation Monitoring System: Method of Operation

Figure 4:
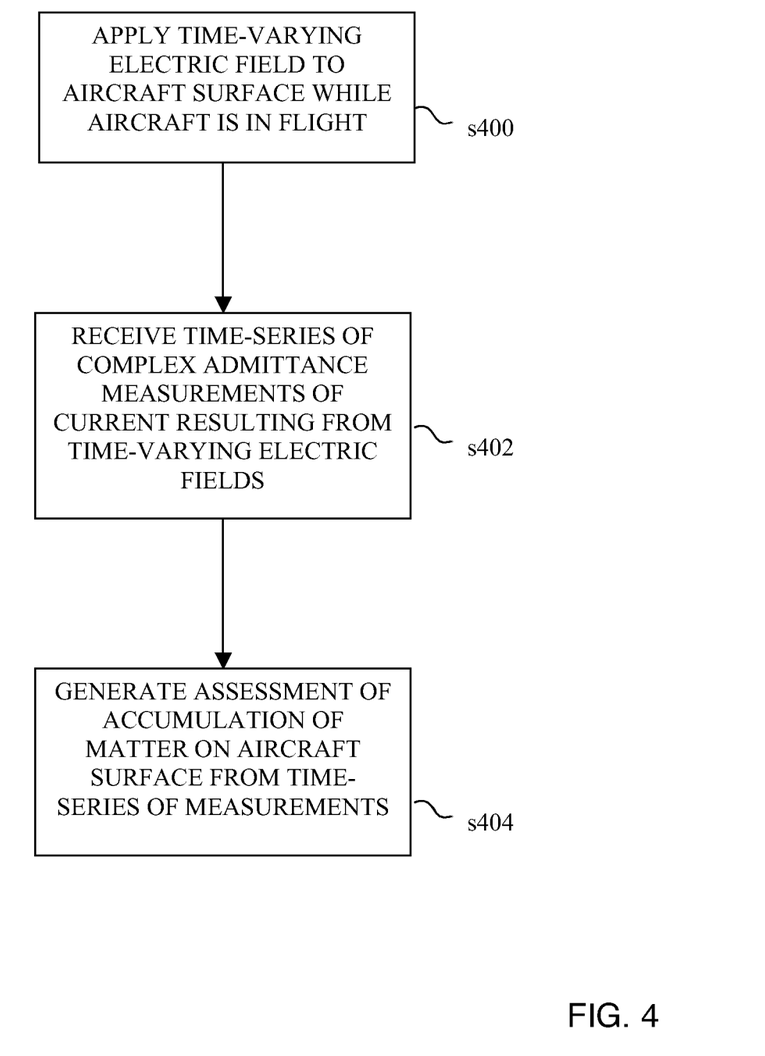
FIG. 4 is a flow-chart depicting the method of operation of the matter accumulation monitoring system.

The method of operation of the matter accumulation monitoring system 100 will now be described with reference to FIG. 4.

At step S400, the matter accumulation monitoring system 100 applies time-varying electric fields to the aircraft surfaces and/or engine surfaces. To do so, the analog signal generator 320 of the SPU 300 may apply a time-varying analog voltage signal to the electrodes 208 of the electric field sensor(s) 202 (via the signal amplifier 204), with the voltage signal applied to the first electrode portion 208a being 180 degrees out of phase with the voltage signal applied to the second electrode portion 208b. The alternating electric fields are typically applied to the aircraft surfaces/engine surfaces while the aircraft is in flight.

At step S402, the SPU 300 generates a time-series of measurement data sets, each measurement data set comprising a complex admittance measurement of the resulting current produced in the electric field sensor unit 200, and optionally the temperature of the aircraft surfaces/engine surfaces. To do so, the A/D converter 322 may periodically sample the resulting current produced in the associated electric field sensor(s) 202, and the signal processor 330 may generate the time-series of measurement data sets from the digitized current measurement samples and optionally the temperature measurement samples. As noted above, the values in the measurement data sets, and the variability in those values between successive measurement data sets, will vary in accordance with the characteristics of the matter accumulating on the aircraft surfaces/engine surfaces.

At step S404, the SPU 300 generates an assessment of the instantaneous accumulation of matter (e.g. ice crystals) on the aircraft surfaces/engine surfaces. To do so, the signature monitor 310 may query the signatures database 350 with the time-series of measurements from one or more of the received measurement data sets, and generate the assessment from a correlation between the time-series of measurements and the predetermined matter accumulation profiles stored in the signatures database 350. As discussed above, each predetermined matter accumulation profile is associated with a particular characteristic (e.g. thickness, matter type) of accumulated matter (e.g. ice crystals).

Where the time-series of received measurements correlates well with a particular matter accumulation profile (the received measurement data sets are identical or similar to one or more of the predetermined matter accumulation profiles), the SPU 300 may generate the assessment from the characteristics of the located matter accumulation profile.

However, typically an aircraft will be fitted with a plurality of electric field sensor units 200, each located at a respective aircraft surface/engine surface. Accordingly, the SPU 300 may generate the assessment by querying the signatures database 350 with the measurement data sets received from a plurality of the electric field sensor units 200, and generate the assessment from a correlation between the received measurement data sets and a plurality of the predetermined matter accumulation profiles. In this variation, the assessment may include characteristics from the various matter accumulation profiles. Alternately, the signature monitor 310 may generate the assessment by applying the measurement data sets as inputs to a matter assessment algorithm.

The SPU 300 may thereafter transmit the results of the assessment to the aircraft cockpit for display on cockpit instrumentation. Alternately, or additionally, the SPU 300 may initiate an automated control action (e.g. activate an alarm, invoke a reduction in the aircraft speed) in accordance with a result of the correlation. For example, the SPU 300 may activate an alarm if the signature monitor 310 determines that ice crystals in excess of a threshold amount have accreted on an aircraft surface/engine surface).

After an excess ice accumulation has been detected, the SPU 300 may activate the heater of the associated electric field sensor unit(s) 200 to thereby melt the ice accumulation at the respective electric field sensor unit(s) 200. During this phase, the SPU 300 may continue to use the measurement data sets received from the electric field sensor units 200 to generate an assessment of the instantaneous accumulation of ice crystals on the aircraft surfaces/engine surfaces, and may maintain the heater(s) active until the assessment indicates that the ice accumulation proximate the respective electric field sensor unit(s) 200 has been shed. Accordingly, the SPU 300 may periodically activate and deactivate the heater(s) as the aircraft is in flight, in accordance with the detected ice accumulation.

The SPU 300 may also correlate the measurement data sets received from the electric field sensor units 200 (while a heater is active and the ice accumulation is being shed) with the matter accumulation profiles to further confirm the identity of the substance that had accumulated proximate the electric field sensor unit(s) 200.

We claim:

1. A method of monitoring for the in-flight accumulation of matter on an aircraft engine surface, comprising the steps of:
    an electric field sensor applying a time-varying electric field to an engine surface of an aircraft while the aircraft is in flight, the electric field sensor being thermally-coupled and thermally-matched to the engine surface, the electric field sensor including a plurality of electrodes and a ground ring disposed around the electrodes, wherein the ground ring is configured to reduce a sensitivity of the electric field sensor to electric fields outwards of the ground ring;
    a sensor processing unit receiving in substantially real-time from the electric field sensor at least one measurement set comprising a measurement of a phase and a magnitude of a current detected by the electric field sensor and resulting from the time-varying electric field;
    the sensor processing unit generating an assessment in substantially real-time of an instantaneous accumulation of matter on the engine surface from the at least one measurement set; and
    the sensor processing unit activating an alarm upon the assessment indicating an accumulation of matter on the engine surface.

2. The method according to claim 1, wherein the electric field sensor is aerodynamically-matched to the engine surface.

3. The method according to claim 2, wherein the generating an assessment comprises the sensor processing unit generating an assessment of an accretion of ice crystals on the engine surface, and the activating an alarm comprises the sensor processing unit activating the alarm upon the assessment indicating the accretion of ice crystals on the engine surface in excess of a threshold amount.

4. The method according to claim 3, wherein the generating an assessment comprises the sensor processing unit querying a database of predetermined matter accumulation profiles with the at least one measurement set, the matter accumulation profiles each being associated with a respective in-flight accretion of ice crystals on a reference surface, and the activating an alarm comprises the sensor processing unit activating the alarm upon the at least one measurement set correlating with at least one of the predetermined matter accumulation profiles.

5. The method according to claim 4, wherein each said matter accumulation profile comprises a set of predetermined complex admittances, and the querying a database comprises the sensor processing unit calculating complex admittance measurements from the phase and magnitude of the resulting current, and querying the database with the calculated complex admittance measurements for corresponding predetermined complex admittances.

6. The method according to claim 3, wherein the sensor processing unit is configured with a matter assessment algorithm, the generating an assessment comprises the sensor processing unit applying the measurement data sets as inputs to the matter assessment algorithm, and the activating an alarm comprises the sensor processing unit activating the alarm upon the matter assessment algorithm indicating the accretion of ice crystals on the engine surface.

7. The method according to claim 2, wherein the engine surface of the aircraft comprises one of a cowling of a turbofan engine, an air intake duct of a turbofan engine, a carburetor mouth of a piston engine, a throttle body of a piston engine, and an internal engine surface.

8. The method according to claim 1, wherein the electric field sensor comprises:
    an insulating substrate, wherein the plurality of electrodes are disposed on the substrate;
    a plurality vias coupled to the plurality of electrodes and extending through the substrate at a right angle to the plurality of electrodes;
    and
    an insulator disposed over the plurality of electrodes and mounted to the engine surface of the aircraft, wherein the ground ring is disposed around the plurality of electrodes and the plurality of vias, and wherein the insulator is mounted substantially flush with and aerodynamically-matched to the engine surface, and is thermally-matched to the engine surface.

9. The method according to claim 8, wherein the plurality of electrodes comprises a plurality of first electrodes and a plurality of second electrodes interleaved and non-contacting with the plurality of first electrodes, wherein the first electrodes are not in contact with each other, and the second electrodes are not in contact with each other, and the plurality of first electrodes are disposed parallel to the plurality of second electrodes on the substrate.

10. The method according to claim 9, wherein the plurality of vias comprises a first via portion and a second via portion, the vias of the first via portion are coupled to the plurality of first electrodes, and the vias of the second via portion are coupled to the plurality of second electrodes.

11. An in-flight engine matter accumulation monitoring system, comprising:
an electric field sensor unit thermally-coupled and thermally-matched to an engine surface of an aircraft, the electric field sensor including a plurality of electrodes and a ground ring disposed around the electrodes, wherein the ground ring is configured to reduce a sensitivity of the electric field sensor to electric fields outwards of the ground ring; and
a sensor processing unit configured to receive in substantially real-time from the electric field sensor at least one measurement set comprising a measurement of a phase and a magnitude of a current detected by the electric field sensor and resulting from a time-varying electric field applied by the electric field sensor to the engine surface, the sensor processing unit being further configured to generate an assessment in substantially real-time of an instantaneous accumulation of matter on the engine surface from the at least one measurement set and to activate an alarm upon the assessment indicating an accumulation of matter on the engine surface.

12. The monitoring system according to claim 11, wherein the electric field sensor is aerodynamically-matched to the engine surface.

13. The monitoring system according to claim 12, wherein the sensor processing unit is configured to generate an assessment of an accretion of ice crystals on the engine surface, and to activate the alarm upon the assessment indicating the accretion of ice crystals on the engine surface in excess of a threshold amount.

14. The monitoring system according to claim 13, wherein the sensor processing unit is configured to generate the assessment by querying a database of predetermined matter accumulation profiles with the at least one measurement set, the matter accumulation profiles each being associated with a respective in-flight accretion of ice crystals on a reference surface, and is configured to activate the alarm upon the at least one measurement set correlating with at least one of the predetermined matter accumulation profiles.

15. The monitoring system according to claim 14, wherein each said matter accumulation profile comprises a set of predetermined complex admittances, and the sensor processing unit is configured to calculate complex admittance measurements from the phase and magnitude of the resulting current and to query the database with the calculated complex admittance measurements for corresponding predetermined complex admittances.

16. The monitoring system according to claim 13, wherein the sensor processing unit is configured with a matter assessment algorithm, and is configured to generate the assessment by applying the measurement data sets as inputs to the matter assessment algorithm, and to activate the alarm upon the matter assessment algorithm indicating the accretion of ice crystals on the engine surface.

17. The monitoring system according to claim 12, wherein the engine surface comprises one of a cowling of a turbofan engine, an air intake duct of a turbofan engine, a carburetor mouth of a piston engine, a throttle body of a piston engine, and an internal engine surface.

18. The monitoring system according to claim 11, wherein the electric field sensor comprises:
an insulating substrate, wherein the plurality of electrodes are disposed on the substrate;
a plurality vias coupled to the plurality of electrodes and extending through the substrate at a right angle to the plurality of electrodes;
and
an insulator disposed over the plurality of electrodes and mounted to the engine surface of the aircraft,
wherein the ground ring is disposed around the plurality of electrodes and the plurality of vias, and
wherein the insulator is mounted substantially flush with and aerodynamically-matched to the engine surface, and is thermally-matched to the engine surface.

19. The monitoring system according to claim 18, wherein the plurality of electrodes comprises a plurality of first electrodes and a plurality of second electrodes interleaved and non-contacting with the plurality of first electrodes, wherein the first electrodes are not in contact with each other, and the second electrodes are not in contact with each other, and the plurality of first electrodes are disposed parallel to the plurality of second electrodes on the substrate.

20. The monitoring system according to claim 19, wherein the plurality of vias comprises a first via portion and a second via portion, the vias of the first via portion are coupled to the plurality of first electrodes, and the vias of the second via portion are coupled to the plurality of second electrodes.

* * * * *